P. A. McCASKEY.
COOKER.
APPLICATION FILED JULY 6, 1911.

1,093,003.

Patented Apr. 14, 1914.
5 SHEETS—SHEET 1.

FIG.1

WITNESSES:

INVENTOR,
Perry A. McCaskey
By Hull & Smith
ATTYS.

P. A. McCASKEY.
COOKER.
APPLICATION FILED JULY 6, 1911.

1,093,003.

Patented Apr. 14, 1914.
5 SHEETS—SHEET 3.

WITNESSES:
Brennan B. West
Chas C. Watt

INVENTOR,
Perry A. McCaskey,
BY Hull & Smith
ATTYS.

UNITED STATES PATENT OFFICE.

PERRY A. McCASKEY, OF LAKEWOOD, OHIO.

COOKER.

1,093,003.   Specification of Letters Patent.   Patented Apr. 14, 1914.

Application filed July 6, 1911. Serial No. 637,214.

*To all whom it may concern:*

Be it known that I, PERRY A. MCCASKEY, a citizen of the United States, residing at Lakewood, in the county of Cuyahoga and State of Ohio, have invented a certain new and useful Improvement in Cookers, of which the following is a full, clear, and exact description, reference being had to the accompanying drawings.

This invention relates to cookers and, in the embodiments shown herein, is adapted more particularly to the type of cookers having non-conducting walls designed to retain heat for a considerable time.

One of the objects of the invention is to provide a cooker of this kind with a particularly effective heater, preferably of the electric type, so arranged and constructed that an article placed within the cooker may be raised by said heater to the desired initial temperature, or may receive therefrom the necessary or desirable initial cooking, before the cooker operates in the ordinary or "fireless" manner.

Further objects of the invention are:—to provide a cooker of the type referred to with an independent source of heat operating in such manner that, when a desired temperature is attained within the cooker, the heating means may be automatically cut out or rendered inoperative; to provide means whereby the temperature at which the heater may be rendered so inoperative can be varied, to accommodate varying conditions of use and varying articles to be cooked; also to provide, in a cooker of the type referred to, a self-contained heating attachment of the electric variety which may be conveniently removed from the cooker when it is desired to use it as a simple or ordinary fireless cooker, when it is desired to clean the interior of such cooker and the heater itself, or even when it may be desired to use the heater independently of the cooker for various purposes, as toasting, frying, etc.; to provide a cooker and heater having coöperating features whereby the heater itself and the connections whereby it may be automatically cut off or rendered inoperative are substantially unaffected by the conditions existing in the cooking chamber.

A cooker constructed in accordance with my invention secures economy in fuel, time and evaporation and enables one to cook articles more cheaply than is the case with any other kind of heater with which I am familiar; enables one to confine the heat and the evaporation from the beginning to the end of the cooking operation, the cooking chamber being closed (which prevents the escape of evaporation and aroma) and the retention of the heat being obtained through the non-conducting walls of the chamber; and enables the cooking operation to be obtained more conveniently than with any other type of cooker with which I am familiar. In order to cook a certain article, it is necessary only to place the same within the cooker, and turn on the heater. When the desired temperature is reached, the heater is automatically cut out without opening the cooker, without the loss of any heat, and without requiring any attention whatever on the part of the operator, and the remainder of the cooking operation is then conducted in the ordinary "fireless" manner.

With the foregoing general objects in view, the invention may be described further as consisting of the combinations of elements embodied in the claims hereto annexed and illustrated in the drawings forming part hereof, wherein—

Describing now by reference characters, the various parts illustrated herein, 1 denotes a base, of wood or similar insulating material, on which is supported the casing of the cooker. This casing is cylindrical and is shown as having an open top and closed bottom. The vertical wall of the casing consists of an outer sheet metal cylinder 2 and an inner sheet metal cylinder or lining 3 between which there is interposed suitable non-heat conducting material 4, such as asbestos. The non-heat conducting material 4 extends beneath the bottom of the lining 3 and between the same and a sheet metal plate 5 which completes the outer covering of the casing and is supported by the base 1. The casing of the cooker is open at the top and is provided with a cover 6 of any suitable construction, the same being shown as provided with a depending central portion 7 adapted to fit within the lining 3.

Supported by the base is an electric switch of ordinary construction, said switch comprising a button 8 and a casing 9, the casing being shown as mounted in a recess in the base.

Figure 1:
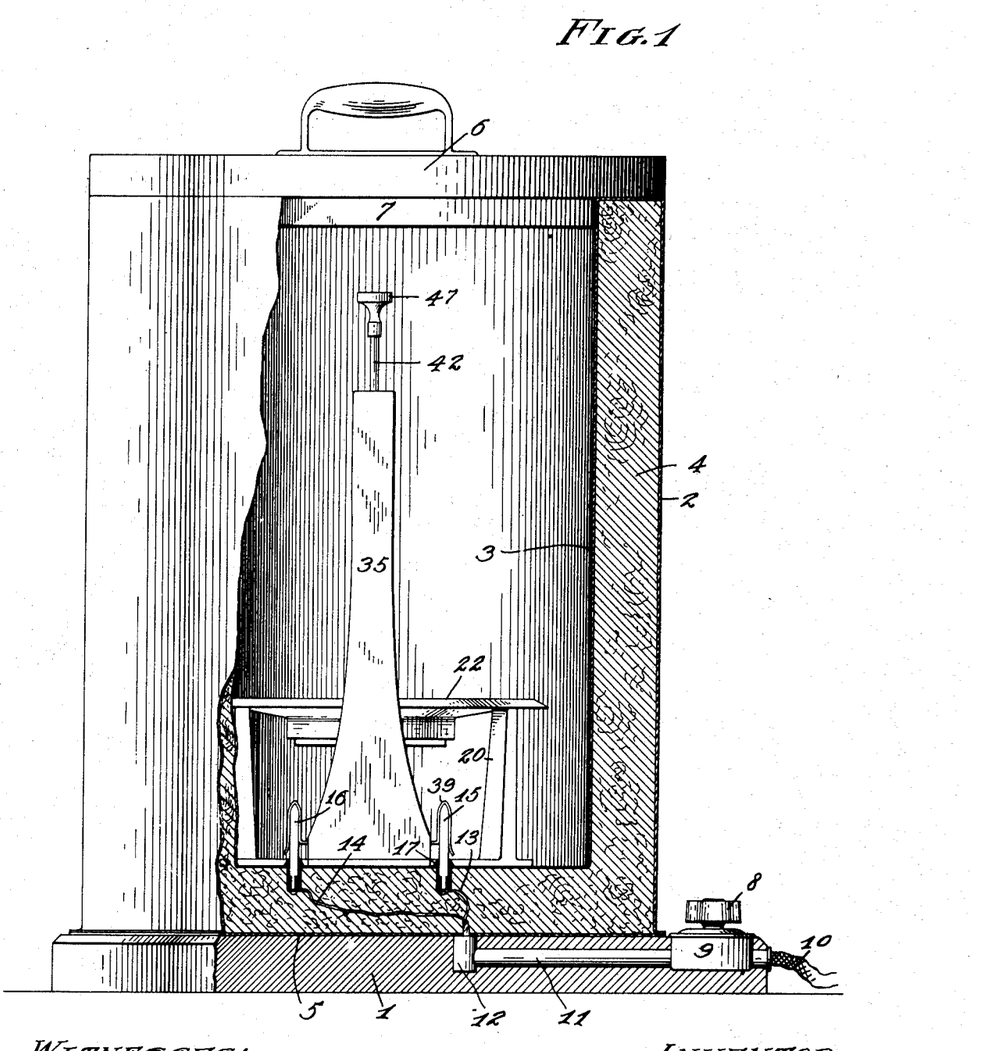
Figure 1 represents a view, partly in elevation and partly in vertical section, of a cooker constructed in accordance with my invention.
Figure 2:
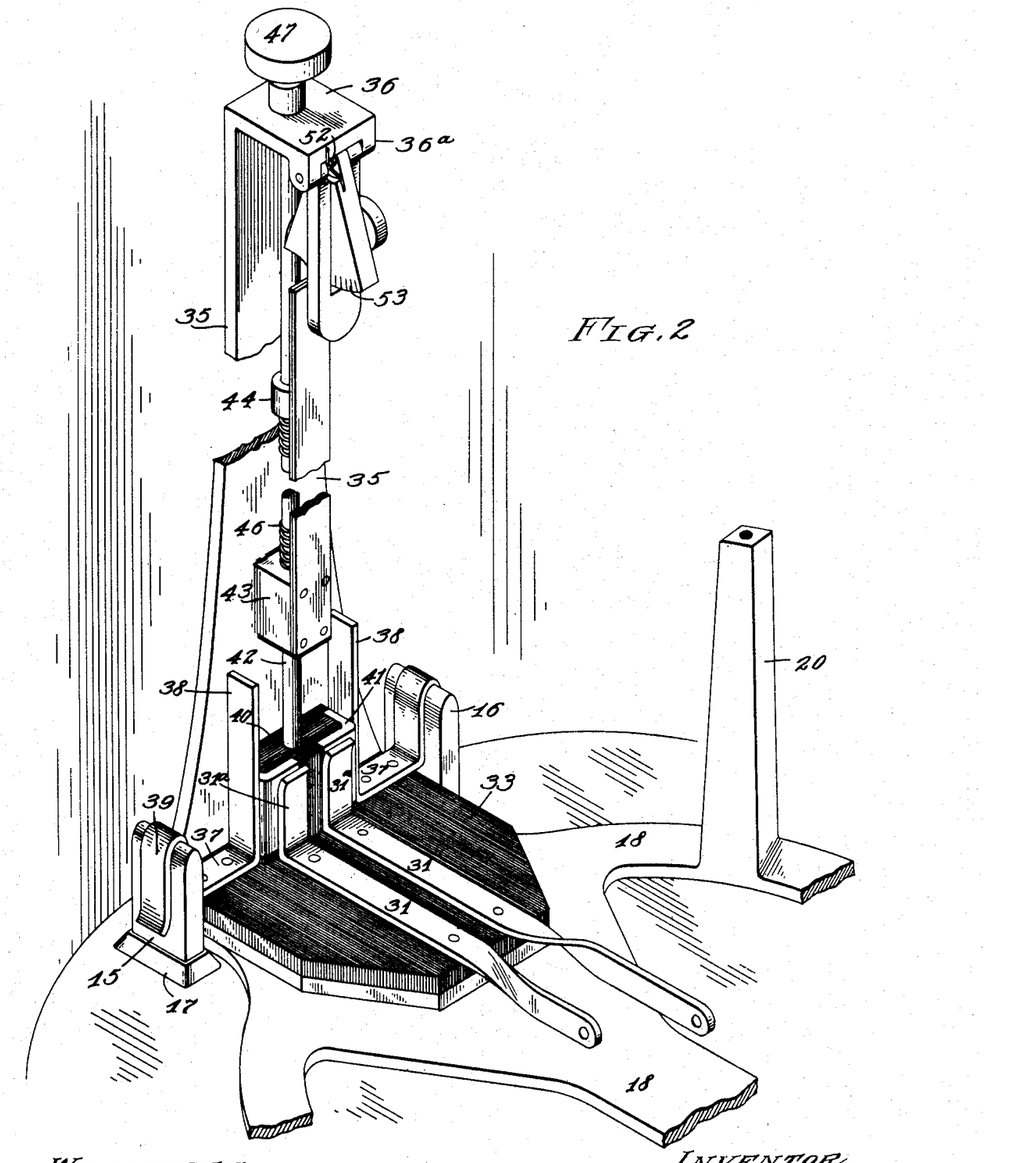
Fig. 2 represents a perspective view illustrating the removable supporting base of the heater with the circuit-closing and breaking mechanism supported thereon.

A cord 10 leads to the switch and the wires of said cord extend from the casing 9 through a tube 11 mounted in the base and through a vertical branch 12 of said tube to a pair of terminals projecting through the bottom lining of the casing. The conductor wires are shown at 13 and 14 and the terminals at 15 and 16, respectively. These terminals are conveniently made as metal blocks having rounded upper ends as shown in Fig. 2 and have their lower ends embedded in insulating material 17, such material extending upwardly a considerable distance above the sheet metal lining of the bottom of the casing, for a purpose to be described.

The terminals 15 and 16 are intended to coöperate with an electric heater capable of convenient insertion into and removal from the casing, said heater having automatic means (a thermostat) whereby the heater may be rendered inoperative through the breaking of its circuit when the temperature within the cooking chamber reaches a predetermined point. The heater and its coöperating parts are mounted upon an annular base plate 18, forming part of a frame, said plate supporting at its central portion a block 19 of insulating material, such as asbestos cement, and a plurality of standards 20. These standards extend above the block 19 and support at their upper ends an annular plate or grid 21. This plate or grid is preferably of the construction shown and is provided near its outer periphery with an annular flat seating surface 22 upon which the bottom of the disk to be heated may be supported. The plate is provided with an opening at its center surrounded by a downwardly extending flange or sleeve 23. The plate 21 supports at its central portion an electric heater 24, said heater being provided with an outwardly extending ledge 25 by which it is supported on the central portion of the plate 21 with its body fitting within the sleeve 23. This heater may be of any preferred construction and comprises generally a body of insulating material, such as asbestos cement, having the resistance embedded therein. The ledge 25 rests upon a seat 26 formed as an annular depression at the central portion of the plate 21. From this depression a series of pockets 27 extend outwardly to the seat 22, the bottoms of said pockets being inclined upwardly from the seat 26 and merging at their outer ends with the inner surface of the seat 22. The upper surface of the plate 21, between the pocket 27, is on the same plane as the seat 22. The purpose of this construction is to utilize in a most efficient manner the heat radiated from the body 24. When a vessel is supported above a heater body in the ordinary manner, the heated air will pass around the bottom of the vessel, and much of the efficiency of the heater will be lost thereby. By the construction shown herein this circulation is largely prevented and an article supported above the heater body 24 is more efficiently and economically heated.

Within the block 19 are bushings 28 of conducting material, having their upper ends extending to the top of the block.

29 denotes a central neck depending from the heater body 24 and having the terminal pins 30 adapted to fit within and form electrical connection with the bushings 28. These terminals are connected to the opposite ends of the resistance (not shown) embedded in the block 24. 31 denotes a pair of straps having their ends electrically connected with the bushings 28, as by screws 32. These straps are mounted upon and supported by a block 33 of insulating material mounted on the horizontal base 34 of a standard 35 having at its upper end a bracket 36. This base is preferably secured to the base plate 18.

Secured to the insulating block 33 is a pair of contacts, each contact being shown as a strap 37 having a vertical branch 38 and an inverted U-shaped branch 39 adapted to fit upon and form close electrical contact with the rounded end of block 15. The upper ends of the branches 38 are spaced apart to form a vertical guideway for a circuit-closing block. This block comprises a body 40 of insulating material adapted to slide between the branches 38 and having a pair of angular contact plates 41 thereon, one side of each plate being adapted to contact with a branch 38 and the other side of the plate being adapted to contact with the upturned fingers 31ª of a strap 31.

Figures 3, 4:
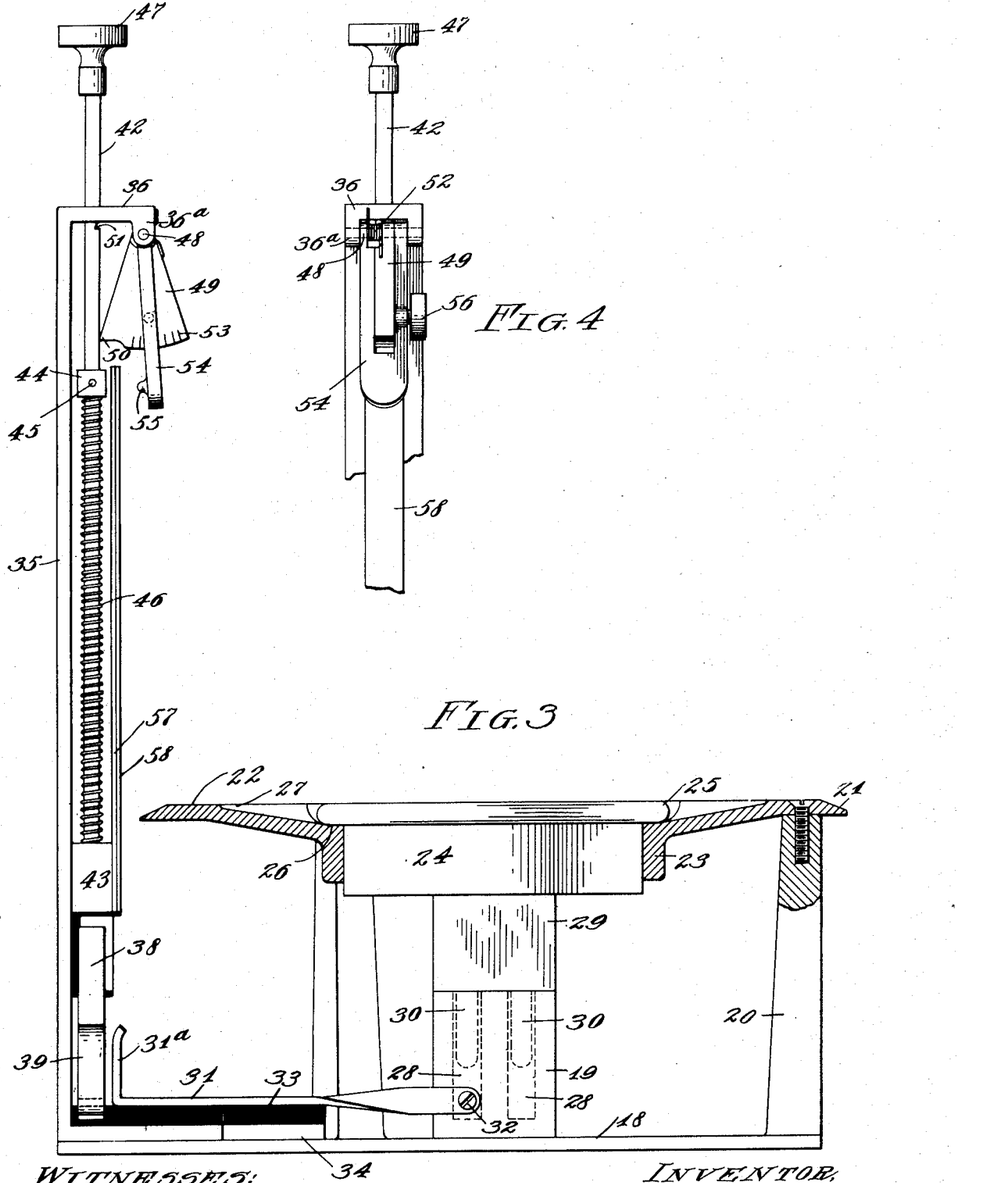
Fig. 3 represents a view, partly in section and partly in elevation, of the heater, its supporting base, and the circuit-making and breaking devices.
Fig. 4 a detail in elevation of the aforesaid devices.
Figure 5:
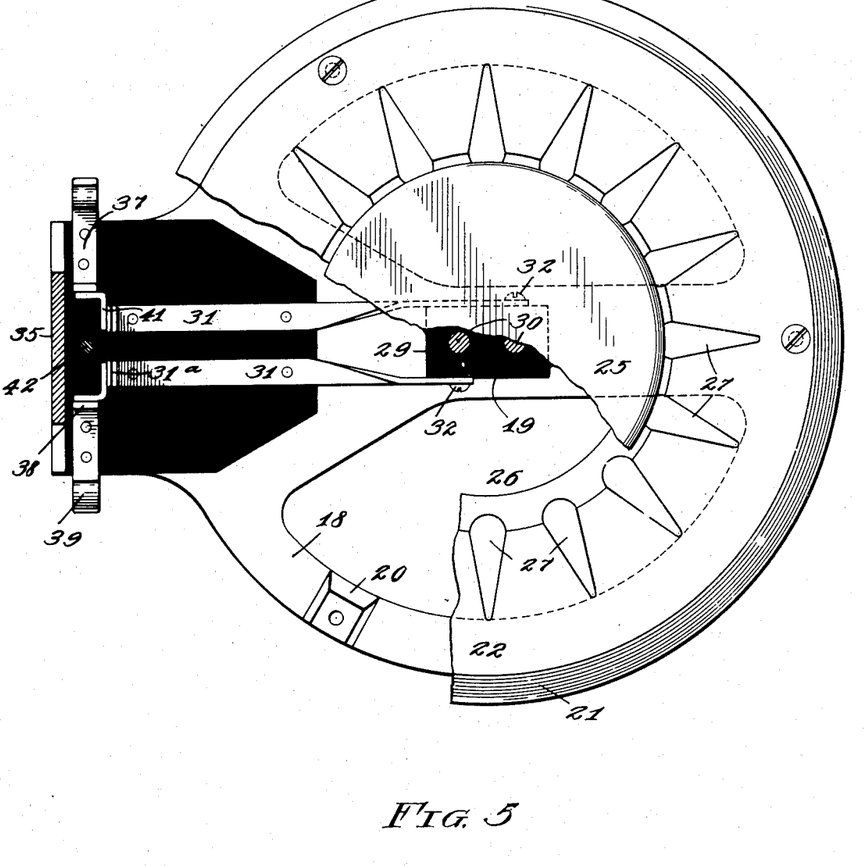
Fig. 5 a plan view, with parts broken away, of the removable heating attachment.

The block 40 is carried by a rod 42 slidably mounted in the bracket 36 and in a block 43 carried by the standard 35. This rod is provided with a collar 44 which is vertically adjustable thereon, being secured in place by a set screw 45. The rod is surrounded by a spring 46, interposed between the collar 44 and the block 43. This spring normally holds the rod and block 40 elevated, with the plates 41 out of engagement with the strap extensions 31ª, as shown in Fig. 3. The rod is provided at its upper end with an operating handle or push button 47.

The bracket 36 is provided with a pair of downwardly projecting lugs 36ª supporting a pin 48 on which is pivoted a latch 49. This latch is shown as provided with a detent 50 adjacent to the rod 42 and adapted to enter a notch 51 in said rod and hold the latter depressed, with the contact plates 41 in engagement with the strap extensions 31ª. The spiral spring 52 surrounds the pin 48, with one end bearing against the bracket 36 and its other end against the latch 49 and tending to force the latch toward the rod 42.

The lower end of the latch is arc-shaped and is shown as provided with a plurality of graduations 53. Mounted on the pin 48 and provided with a slot through which the latch 49 extends is a yoke 54. This yoke projects below the latch 49 and is provided with a projection 55. The latch and yoke are adjustably connected by a set screw 56, which is threaded into one branch of the yoke and is adapted to bear against the latch. The yoke and its projection constitute an extension for the latch 49 for the purpose of disengaging the detent 50 from the notch 51 in the rod 42.

The thermostat, consisting essentially of a pair of strips 57 and 58 of metals having differing coefficients of expansion is carried by the block 43 with its upper end in operative relation to the projection 55. As is usual in thermostats, these strips are fastened together, as by soldering. The strip 58, in the arrangement shown herein, will be the strip having the lower coefficient of expansion, so that, as the thermostat is heated, its upper end will flex toward the projection 55.

With the parts constructed as described, the operation will be as follows:—Assuming that it is desired to use my invention as a combined heat generator and cooker, the vessel containing the article to be cooked is placed upon the top of the plate or grid 21. By means of the scale 53 and the adjustable connections between the yoke 54 and latch 49, the yoke may be set so as to be engaged by the upper end of the thermostat when the desired temperature is reached within the casing of the cooker. The rod 42 is depressed by means of the handle 47 until the detent 50 enters the notch 51, locking the rod in place. The depression of the rod closes the circuit within the heater through a bushing 28, pin 30, strap 31, strap 38, terminal 15 or 16 and conductor 13 or 14 and through the other bushing, pin, strap 31, strap 38, terminal 16 or 15 and conductor 14 or 13. The cover 6 is placed upon the receptacle and the switch 8 is closed. When the desired temperature is reached within the cooker, the deflection of the upper end of the thermostat causes it to engage the projection 15 and swing the detent 50 out of the notch 51, whereupon the spring 46 automatically elevates the rod 42 and breaks the circuit between the plates 41 and contact fingers 31ª. As the accumulation of juices from cooking or the water of condensation within the bottom of the casing might tend to short-circuit the heater current, the insulation 17 about the terminals 15 and 16 is extended a considerable distance above the metal bottom lining. Should it be desired to remove the heater and its parts, it will be necessary only to lift the base plate 18, whereupon the heater and all of its associated parts, with the exception of the terminals 15 and 16, may be removed from the casing. The presence of these terminals and the arrangement of the conductors with respect thereto are such that the efficiency of my device as a cooker of the ordinary fireless type is not diminished by reason of its adaptability for heat generation.

Figure 6:
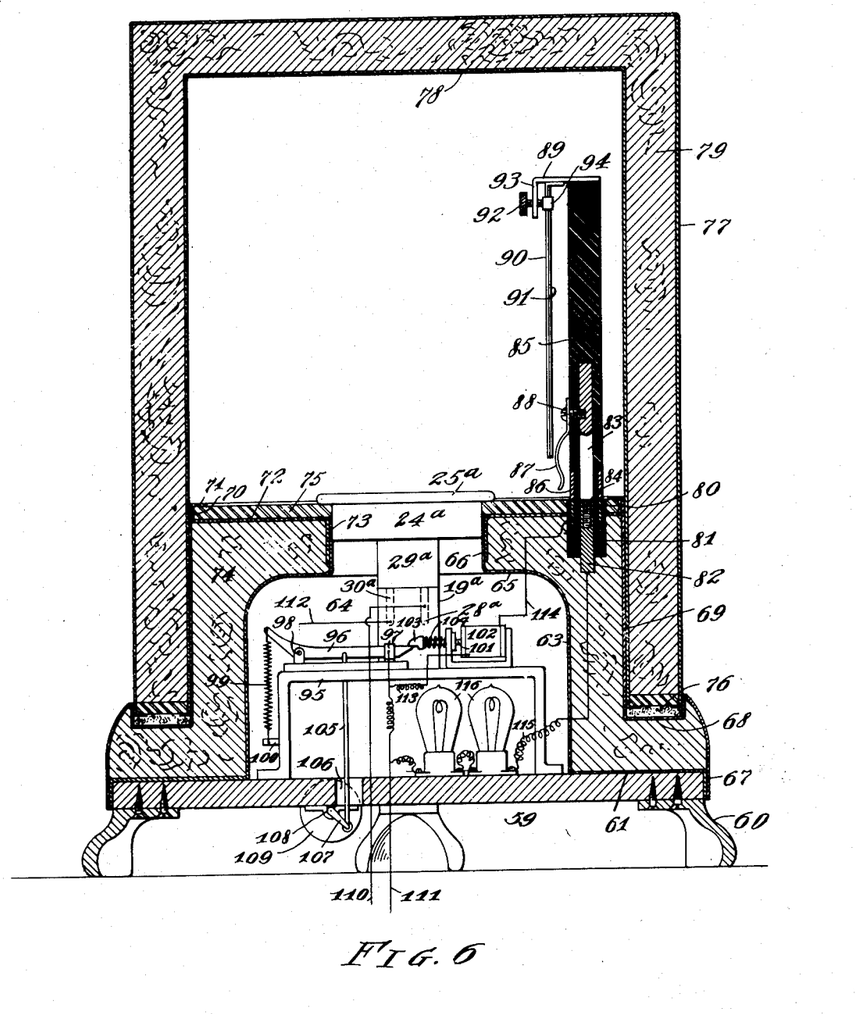
Fig. 6 a vertical sectional view of a modification of the invention illustrated in the preceding views.

In Fig. 6, I have shown a modification of my invention, wherein the electric heater and the connections and parts whereby it may be rendered inoperative are practically removed from the heating space of the cooker. In this view, 59 denotes a base similar to the base 1, shown as supported by legs 60. This base is provided with an annular sheet metal covering 61 on the outer peripheral portion thereof, said sheet metal covering being shown as provided with a depending skirt 62 and being bent upward, as shown at 63, to provide a chamber 64. This metal is shown as bent inwardly at 65 and then upwardly at 66, to provide a neck. Coöperating with the sheet metal parts described is an outer sheet metal casing having its lower end 67 overlapping the skirt 62, said casing extending above the annulus 61 and being bent downwardly, inwardly and upwardly, to provide an annular trough 68, the inner wall of said trough being extended upwardly in cylindrical form, as shown at 69. Coöperating with these parts is a sheet metal cover portion comprising a short exterior cylinder 70, fitting within the upper end of the cylinder 69 and having its upper end bent inwardly at 71. From the bottom of the cylindrical portion 70, the cover extends inwardly, as shown at 72, as far as the neck 66, and is then bent downwardly in contact with said neck, as shown at 73.

The sheet metal parts 61–73 inclusive form a double-walled receptacle, the space between the parts being filled with a non-conducting material 74. Resting on the top of 72 and beneath the flange 71 is an annular cover 75 of non-heat-conducting material, such as asbestos board. The inner edge of this cover receives the outwardly projecting flange 25$^a$ of the electric heater 24$^a$, said heater having the depending neck 29$^a$, and terminal pins 30$^a$, the pins being within bushings 28$^a$ carried by the block 19$^a$.

The annular trough 68 is provided with a gasket 76 of non-heat conducting material, upon which the open bottom of the casing proper is adapted to seat. This casing is constructed in substantially the same manner as that shown in the prior modification and comprises generally an outer cylindrical sheet metal cover 77 and an inner sheet metal lining 78 having interposed therebetween non-heat-conducting material 79.

80 denotes a metallic ring, the upper end of which is substantially in the plane of the top of the cover 75, the ring being embedded in the insulating and non-conducting material 81. Mounted within this material and extending centrally of the ring is a rod 82 of conducting material, said rod having a threaded socket by means of which it may be connected to a terminal 83 having a threaded end 84 and mounted in a post 85 of insulating material having at its lower end a ring 86 of conductive material adapted to abut against and make electrical contact with the ring 80. For facility of assembling, cleaning, etc., the top of the socket is substantially flush with the top of the insulation 81 and ring 80 and the lower end of the terminal 83 is provided with the threaded end 84 fitting said socket. 87 denotes a spring which is secured to the block 85 by means of a screw 88 extending into the rod 82. At the upper end of the block 85 is a bracket 89 from which depends a thermostat comprising a pair of metal plates 90 and 91 secured together, the plate 91 having a smaller coefficient of expansion than the plate 90. The lower end of the thermostat is in operative relation to the spring 87 and is adapted to force the lower end of said spring into contact with the sleeve 86 when a predetermined temperature within the cooker is reached. For the purpose of varying the temperature at which the spring will be forced into engagement with the sleeve, a set screw 92 is mounted in a flange 93 depending from the bracket 89 and is connected to a collar 94 on the thermostat in such manner as, by its adjustment, to vary the normal distance between the bottom of the thermostat and the spring 87.

95 denotes a bridge supported by the base 59 within the chamber 64. Mounted upon this bridge is a knife-blade switch 96, cooperating with the switch blades 97. This switch is pivoted at 98 and has its end projected beyond said pivot and connected by a spring 99 with any suitable point, as a projection 100 carried by the bridge, whereby said spring tends to open the switch. The opposite end of the switch 96 has its lower surface beveled and its upper end engaged by the projecting end of the core 101 of a solenoid 102. The upper surface of the outer end of this core is beveled, as shown at 103, and the outer end of the core is normally held in locking engagement with the adjacent end of the switch 96 by means of a spring 104.

105 denotes a rod connected with the switch 96 and extending through an aperture 106 in the base and connected to the arm 107 of a rock shaft 108, having an operating handle 109.

110 and 111 denote the conductors through which current is supplied to and from the heater and the associated parts.

With the construction described, the operation will be as follows, the device being provided with any desired form of external switch: On closing such switch, current will flow through the conductor 110 to one of the bushings 28$^a$, through the resistance in the electric heater body 24$^a$, through the other bushing 28$^a$, through conductor 112 to switch 96 and through switch blades 97 to conductor 111. Should, however, the temperature at which the electric heater is to be cut out be attained, then the thermostat will force the end of the spring against the sleeve 36 and the circuit will be broken as follows:—The current will flow as before through the switch blades 97 to the conductor 111, thence through the shunt circuit including the conductor 113, solenoid 102, conductor 114, rings 80 and 86, spring 87, rod 82, terminal 83, conductor 115, and resistance 116, to conductor 111. In this manner the solenoid circuit will be closed, the solenoid energized and the core 101 be drawn into the solenoid, releasing the outer end of the switch 96 and permitting the spring 99 to open the circuit. Thereafter the cooker will operate as an ordinary "fireless cooker." The circuit at the point 97 may be closed by merely turning the handle or button 99 to move the switch 96 downwardly. The action of the inclined surface 96$^a$ on the inclined surface 103 at the end of the core will allow the end of the switch 96 to ride over the end of the core, whereupon the spring 104 will lock the switch closed, as shown in Fig. 6.

In both forms of cooker shown herein, the heater is readily removable from the cooker and, when so removed, the cooker may operate in the ordinary "fireless" method. In both forms, the heater may remain within the casing when not in use as well as after having been used and its circuit broken without interfering with the "fireless" operation of the cooker. In both forms of the invention, the heater is provided with terminals 30, 30ᵃ, coöperating with terminal bushings 28, 28ᵃ, in the insulating block 19, 19ᵃ. In both forms of my invention, the heater may be removed and used for general heating and cooking purposes.

In the embodiment of the invention shown in the first five figures of the drawings, the heater, together with the thermostat and circuit-breaking mechanism, is carried on a base (the plate 18) and this base and the associated heater parts are removable as an entity from the casing. When so removed, the heater may be employed for the purpose of toasting, frying, or performing any of the ordinary cooking operations. For this purpose it will be necessary, of course, to use terminals coöperating with the terminals 39. With the heating attachment out of the way, the cooker may be used as an ordinary "fireless" cooker and may be converted at convenience into a combined heat generator and cooker.

Having thus described by invention, what I claim is:—

1. In a cooker, the combination of a casing, a frame removably supported within said casing, an electric heater supported by said frame, a vessel support carried by said frame, means for supplying electric current to said heater, a circuit-breaking device carried by said frame, a thermostat carried by said frame, and connections whereby said thermostat may operate the circuit-breaking device.

2. In a cooker, the combination of a casing, a frame removably supported within said casing, said frame comprising a base plate, standards projecting from said plate, a vessel support on said standards, an electric heater supported by said plate in operative relation to the vessel support, means for supplying electric current to said heater, a circuit-breaking device carried by said base plate, a thermostat supported by said base plate, and connections whereby said thermostat may operate the circuit-breaking device.

3. In a cooker, the combination of a casing having a pair of electric terminals, an electric heater, a circuit-breaking device, a thermostat for operating said device, a supporting frame for said heater, thermostat, and circuit-breaking device removably mounted within the casing, and terminals carried by said frame and adapted to coöperate with the first-mentioned terminals.

4. In a cooker, the combination of a casing having a pair of electric terminals, an electric heater, a supporting frame for said heater removably mounted within the casing, and terminals carried by said frame and adapted to coöperate with the casing terminals.

5. In a cooker, the combination, with a casing, of a supporting plate within said casing, said supporting plate having an external elevated surface adapted to support a vessel, and a heater at the central portion of said plate, said plate being provided with pockets extending outwardly and upwardly from the heater toward the elevated supporting surface.

6. In a cooker, the combination, with a casing, of a supporting plate within said casing, said supporting plate having an external surface adapted to support a vessel, and a heater at the central portion of said plate, said plate being provided with pockets formed in the upper surface thereof and extending outwardly from the heater toward the supporting surface.

7. In a cooker, the combination of a casing, a supporting plate within said casing, said supporting plate having a central opening depressed below the plane of the surrounding portion, a heater mounted in said opening, said plate having pockets extending outwardly from said heater, the bottoms of said pockets being upwardly inclined toward the periphery of the heater.

8. In a cooker, the combination of a casing, a supporting plate within said casing, said supporting plate having a central opening and an annular seat surrounding the opening and depressed below the plane of the surrounding portion of the plate, a heater mounted in said seat and opening, said plate having pockets extending outwardly from said seat, the bottoms of said pockets being upwardly inclined toward the periphery of the heater.

9. A heating attachment for cookers of the confined-heat type, said attachment comprising a base, an electric heater supported thereby, a support for the article to be heated, and a thermostat supported by said base.

10. An attachment for cookers of the confined-heat type, said attachment comprising a base, standards projecting upwardly therefrom, a plate supported by said standards, a heater supported by said base and arranged centrally with respect to said plate, a thermostat, and circuit-breaking mechanism controlled by said thermostat, the thermostat and circuit-breaking mechanism being supported from said base.

11. In a cooker, the combination of a casing having a pair of electric terminals, a heating attachment for said cooker, said attachment comprising a base having coöperating terminals, an electric heater supported by said base and in circuit with said terminals, a thermostat supported by said base, circuit-breaking mechanism supported by said base and controlled by said thermostat, and means carried by said base for adjusting the thermostat to break the circuit at varying temperatures within the casing.

12. A heater attachment for cookers of the confined-heat type, said attachment comprising a supporting frame having terminals, an electric heater supported by said frame and in circuit with said terminals, a thermostat supported by said frame, circuit-breaking mechanism supported by said frame and controlled by said thermostat, and means carried by said frame for adjusting the thermostat relatively to the circuit-breaking mechanism.

In testimony whereof, I hereunto affix my signature in the presence of two witnesses.

PERRY A. McCASKEY.

Witnesses:
J. B. HULL,
BRENNAN B. WEST.